US010403042B2

United States Patent
Roveta et al.

(10) Patent No.: US 10,403,042 B2
(45) Date of Patent: Sep. 3, 2019

(54) SYSTEMS AND METHODS FOR GENERATING AND PRESENTING AUGMENTED VIDEO CONTENT

(71) Applicant: Oath Inc., Dulles, VA (US)

(72) Inventors: Nicholas Roveta, London (GB); Leon Farrell, London (GB); Alexander Marshall, Claygate (GB)

(73) Assignee: Oath Inc., Dulles, VA (US)

( * ) Notice: Subject to any disclaimer, the term of this patent is extended or adjusted under 35 U.S.C. 154(b) by 336 days.

(21) Appl. No.: 14/073,683

(22) Filed: Nov. 6, 2013

(65) Prior Publication Data

US 2014/0125703 A1    May 8, 2014

Related U.S. Application Data

(60) Provisional application No. 61/723,273, filed on Nov. 6, 2012.

(51) Int. Cl.
*H04N 21/81*    (2011.01)
*G06T 19/00*    (2011.01)
(Continued)

(52) U.S. Cl.
CPC ............ *G06T 19/006* (2013.01); *G11B 27/10* (2013.01); *G11B 27/105* (2013.01); *G11B 27/322* (2013.01); *H04N 5/44543* (2013.01); *H04N 21/4316* (2013.01); *H04N 21/4756* (2013.01); *H04N 21/4788* (2013.01); *H04N 21/8146* (2013.01); *H04N 2005/44565* (2013.01)

(58) Field of Classification Search
None
See application file for complete search history.

(56) References Cited

U.S. PATENT DOCUMENTS 8,392,821 B2    3/2013    DeMarco et al.
2002/0194618 A1    12/2002    Okada et al.
(Continued)

FOREIGN PATENT DOCUMENTS

EP    1 524 669 A1    4/2005

OTHER PUBLICATIONS

Extended European Search Report mailed by the European Patent Office dated Apr. 1, 2014, in European Patent Application No. 13005227.7 (6 pages).
(Continued)

*Primary Examiner* — Ryan McCulley
(74) *Attorney, Agent, or Firm* — Bookoff McAndrews, PLLC

(57) ABSTRACT

Computerized systems and methods are provided for generating and providing augmented video content to viewers. In one implementation, a media player executed by a user device obtains playlist data identifying underlying video content and elements of overlay content. The media player may generate augmented video content by merging an element of the overlay content into the underlying video content at a temporal position within the underlying video content that is relevant to the overlay content element, and further, may present the augmented video content to a viewer. The media player may detect a triggering event during the presentation of the augmented video content, and may modify the augmented video content in response to the triggering event.

20 Claims, 10 Drawing Sheets

(51) Int. Cl.
*G11B 27/10* (2006.01)
*G11B 27/32* (2006.01)
*H04N 5/445* (2011.01)
*H04N 21/431* (2011.01)
*H04N 21/475* (2011.01)
*H04N 21/4788* (2011.01)

(56) References Cited

U.S. PATENT DOCUMENTS

| | | | |
|---|---|---|---|
| 2008/0276272 A1* | 11/2008 | Rajaraman | G06Q 30/02 |
| | | | 725/37 |
| 2008/0319852 A1* | 12/2008 | Gardner et al. | 705/14 |
| 2009/0022473 A1* | 1/2009 | Cope | H04N 9/8205 |
| | | | 386/278 |
| 2012/0044250 A1* | 2/2012 | Landers et al. | 345/473 |
| 2012/0124475 A1* | 5/2012 | Foote | G06F 17/30796 |
| | | | 715/719 |
| 2012/0331496 A1* | 12/2012 | Copertino et al. | 725/14 |
| 2013/0326352 A1* | 12/2013 | Morton | G06F 3/0484 |
| | | | 715/719 |

OTHER PUBLICATIONS

Cesar et al., "Past, Present, and Future of Social TV: A Categorization," $3^{rd}$ IEEE International Workshop on Social TV, 2011, pp. 347-351.

* cited by examiner

SYSTEMS AND METHODS FOR GENERATING AND PRESENTING AUGMENTED VIDEO CONTENT

CROSS-REFERENCE TO RELATED APPLICATION(S)

This application claims the benefit of priority to U.S. Provisional Patent Application No. 61/723,273, filed Nov. 6, 2012, the entire disclosure of which is expressly incorporated herein by reference in its entirety.

BACKGROUND

Technical Field

The present disclosure generally relates to computerized systems and methods for providing video content to devices within a network environment, such as the Internet. More particularly, and without limitation, the present disclosure relates to systems and methods that generate augmented video content by merging elements of overlay content into underlying video content.

Background Information

Today, the popularity of online video delivery presents challenges and opportunities not present within traditional broadcast television or cable television environments. For example, in a traditional broadcast television environment, editors may add content to or superimpose content onto portions of a television program prior to broadcast without modifying the underlying broadcast. For example, an editor may superimpose video content relating to a subsequent news program onto the credits of television program without modifying an underlying content associated with the television program.

Although post-productions solution enable a developer to incorporate multimedia content into an existing program or content, these post-production solutions require the developer to manually modify the existing content to include the multimedia content. The time and computational resources required by these post-production solutions hinders the developer's ability to dynamically and adaptively modify a broadcast or program to include timely multimedia content that enhances a viewing experience of a user. Moreover, computerized solutions do not exist for augmenting or modifying online video content with multimedia or other additional content.

In view of the foregoing, there is a need for improved systems and methods for efficiently generate augmented content and provide that augmented content to devices within a network environment, such as the Internet. There is also a need for such systems and methods that can be implemented in a computer-based environment.

SUMMARY

Consistent with embodiments of the present disclosure, computer-implemented systems and methods are provided for generating and presenting augmented video content to viewers. In one exemplary embodiment, a method is provided that comprises obtaining playlist data identifying an element of video content and one or more elements of overlay content and generating augmented video content in accordance with the obtained playlist data. In some aspects, the generating comprising merging a first one of the overlay content elements into the video content element at a temporal position within the video content element defined by the playlist data.

In some embodiment, the method may generate one or more electronic instructions to present the augmented video content to a viewer, and detect at least one of a first triggering event or a second triggering event during the presentation of the augmented video content. The first triggering event may be associated with an expiration of the first overlay content element, and the second triggering event may be associated with a merger of a second one of the overlay content elements into the video content element. The method may also include generating modified augmented video content in response to the detected first or second triggering events.

Consistent with further embodiments of the present disclosure, an apparatus is provided that includes a storage device and at least one processor coupled to the storage device. The storage device stores a set of instructions for controlling the at least one processor, and the at least one processor, being operative with the set of instructions, is configured to obtain playlist data identifying an element of video content and one or more elements of overlay content. The at least one processor is further configured to generate augmented video content in accordance with the obtained playlist data. In some aspects, the at least one processor is further configured to merge a first one of the overlay content elements into the video content element at a temporal position within the video content element defined by the playlist data.

In accordance with some embodiments, the at least one processor is configured to generate one or more electronic instructions to present the augmented video content to a viewer, and detect at least one of a first triggering event or a second triggering event during the presentation of the augmented video content. The first triggering event may be associated with an expiration of the first overlay content element, and the second triggering event may be associated with a merger of a second one of the overlay content elements into the video content element. The at least one processor may also be configured to generate modified augmented video content in response to the detected first or second triggering events.

Other embodiments of the present disclosure relate to a tangible, non-transitory computer-readable medium that stores a set of instructions that, when executed by at least one processor, perform a method that includes obtaining playlist data identifying an element of video content and one or more elements of overlay content, and generating augmented video content in accordance with the obtained playlist data. In some aspects, the method includes merging a first one of the overlay content elements into the video content element at a temporal position within the video content element defined by the playlist data.

In still further embodiments, the method includes generating one or more electronic instructions to present the augmented video content to a viewer, and detecting at least one of a first triggering event or a second triggering event during the presentation of the augmented video content. The first triggering event may be associated with an expiration of the first overlay content element, and the second triggering event may be associated with a merger of a second one of the overlay content elements into the video content element. The method may also include generating modified augmented video content in response to the detected first or second triggering events.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

DETAILED DESCRIPTION OF EXEMPLARY EMBODIMENTS

Figure 1:
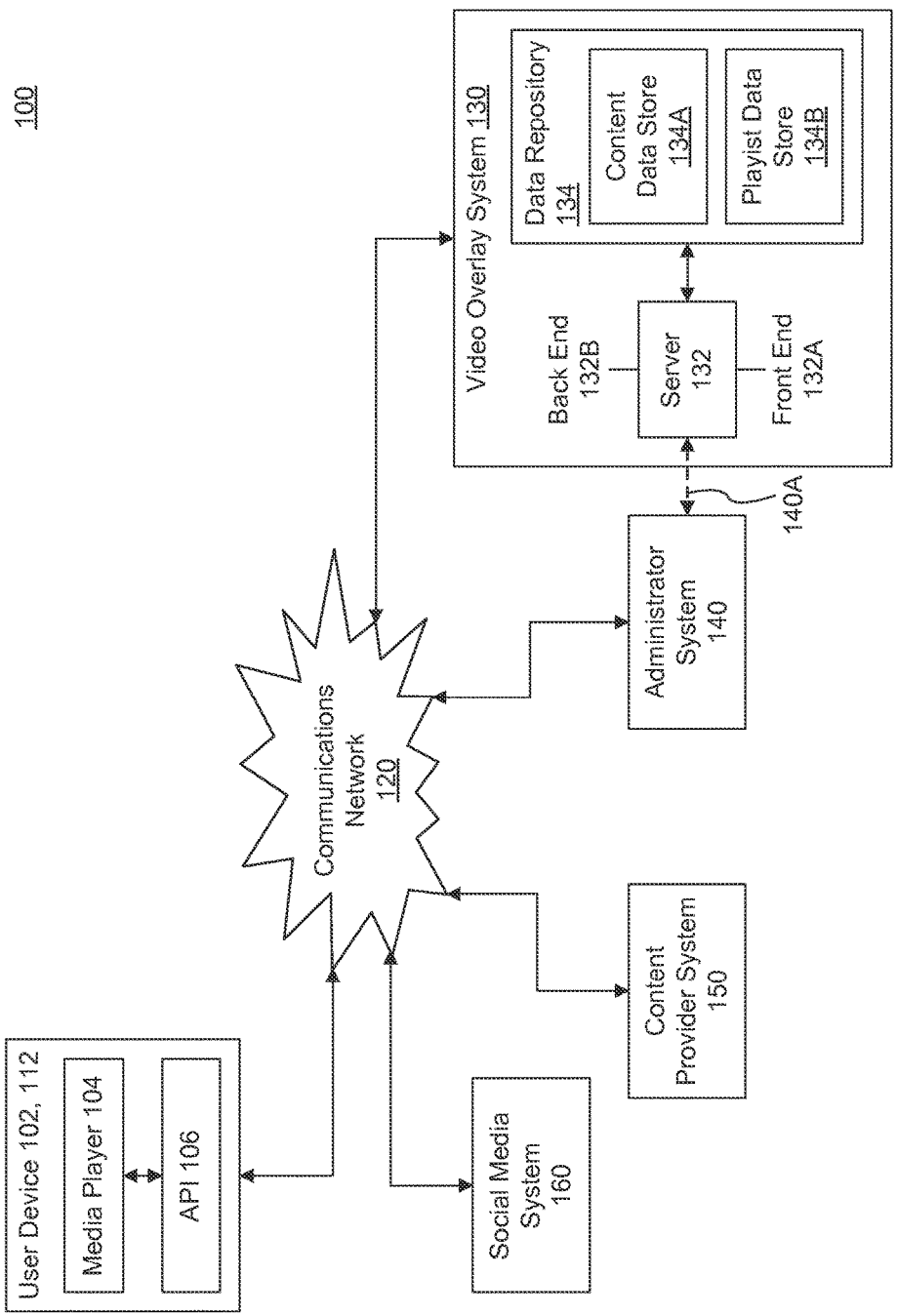
FIG. 1 is a diagram of an exemplary computing environment within which embodiments of the present disclosure may be practiced.

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The disclosed embodiments relate to computerized systems and methods that generate and present augmented video content to a viewer. In some embodiments, the augmented video content may include one of more elements of multimedia content that are merged into underlying video content during presentation to the viewer. By way of example, the merged multimedia content may be of potential relevance to the viewer and to one or more portions of the underlying video content, and as such, the augmented video content may provide the viewer with a unique multimedia experience tailored to the viewer's interests.

The merged multimedia content may, in certain aspects, completely or partially obscure portions of the underlying video content, and may thus "overlay" portions of the underlying video content upon presentation to the viewer in a corresponding media player. Further, the viewer's media player may present elements of the merged multimedia content (e.g., the overlay content) at default positions within a corresponding container or window, or alternatively, at spatial positions within the container or window proximate to particular visual elements of the underlying video content. Additionally or alternatively, the viewer's media player may merge and display the multimedia content within the underlying video content at specific times or periods of time during presentation of the underlying video content. By way of example, the specific times or periods of time may correspond to portions of the underlying video content having particular relevance to the overlay content.

In some embodiments, playlist data may identify the overlay content and underlying video content that collectively establish the augmented video content, and further, may define one or more parameters or settings that facilitate the merger of the overlay content into the underlying video content. For example, the parameters may specify the times or periods of time during which the overlay content will be merged into the underlying content, and further, one or more spatial positions at which the viewer's media player may present the overlay content within a corresponding display window or container. In certain aspects, the playlist data and corresponding augmented video content may be assigned a common alphanumeric identifier, and an application program interface (API) associated with the viewer's media player may leverage the alphanumeric identifier to obtain the playlist data prior to initiating playback of the augmented video content, as described below.

FIG. 1 illustrates an exemplary computing environment 100 within which embodiments consistent with the present disclosure may be practiced. The number and arrangement of components in computing environment 100 are exemplary and presented for purposes of illustration. Additions, substitutions, and modifications may be made to these components, consistent with the teachings and embodiments of the present disclosure.

In FIG. 1, environment 100 includes a communications network 120 that interconnects user device 102, a video augmentation system 130, an administrator system 140, a content provider system 150, and a social media system 160. Further, in some embodiments, administrator system 140 may be in direct communication with video overlay system 130, for example, across wired or wireless connection 140A.

Communications network 120 may be implemented with any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. Consistent with embodiments of the present disclosure, network 120 may comprise the Internet and include any publicly-accessible network or networks interconnected via one or more communication protocols, including, but not limited to, hypertext transfer protocol (HTTP) and transmission control protocol/Internet protocol (TCP/IP). Moreover, communications network 120 may also include one or more mobile device networks, such as a GSM network or a PCS network, that allow user devices, such as user devices 102 and 104, to send and receive data via applicable communications protocols, including those described above.

User device 102 may be implemented with using an apparatus with at least one processor or a computer-based system. For example, user device 102 may include, but is not limited to, a personal computer, a laptop computer, a notebook computer, a hand-held computer, a personal digital assistant, a portable navigation device, a mobile phone, a smart phone, a set top box, a third party portals, an optical disk player (e.g., a DVD player), a digital video recorder (DVR), a wearable computing device (e.g., a smart watch or a wearable eyewear-based computing device), an embedded computing and any additional or alternate computing device operable to transmit and receive data across network 120.

In one embodiment, user device 102 may execute a media player 104 capable of receiving content through a corresponding application programming interface (API) 106, and rendering and presenting the received content to a viewer. Further, in some embodiments, media player 104 may be configured merge one or more elements of multimedia content (e.g., overlay content) into underlying video content to form augmented video content for presentation to the viewer. By way of example, media players consistent with the disclosed embodiments include, but are not limited to, media players capable of presenting multimedia content created in Adobe Flash™ format, media players having APIs compatible with the Video Player Ad-Serving Interface Definition (IAB-VPAID) interface, proprietary media players (e.g., provided by a publisher or authorized distributor of content), or through any additional or alternate media player capable of receiving content from various severs and computing systems across a communications network.

Video augmentation system 130 may include one or more computer systems and servers configured to process and store information, and execute software instructions to perform one or more processes consistent with the disclosed embodiments. In an embodiment, video augmentation system 132 may include a server 132 and a data repository 134. Server 132 may include a front end 132A, and a back end 132B, which is disposed in communication with front end 132A. In the exemplary embodiment of FIG. 1, front end 132A and back end 132B of server 132 may be incorporated into a hardware unit, for example, a single computer, a single server, or any additional or alternate computing device apparent to one or skill in the art. Further, in other embodiments, front end 132A may be a software application, such as a web service, executing on server 132. However, server 132 is not limited to such configurations, and, in additional embodiments, front end 132A may be executed on any computer or server separate from back end 132B.

Data repository 134 may include a content data store 134A and playlist data store 134B. In one embodiment, content data store 134A may include one or more elements of electronic content that, for example, may be delivered to user device 102 in response to corresponding request (e.g., delivered through API 106 of media player 104). By way of example, the electronic content may include video content (e.g., broadcast television programs, cable video programs, viewer-generated video content, and advertisements), in formats suitable for rendering and presentation by user device 102. Suitable formats include, but are not limited to, Flash video formats (e.g., video content stored in SWF, FLV, and/or FLA format), a Moving Pictures Expert Group (MPEG) format, an Audio-Visual Interleave (AVI) format, and a QuickTime format (e.g., .MOV and .QT files).

In further embodiments, the electronic content stored within content data store 134A may include other forms of multimedia content suitable for delivery to and presentation by user device 102. For example, multimedia content consistent with the disclosed embodiments includes, but is not limited to, digital images (e.g., logos of content providers and advertisements), textual content, executable programs (e.g., proprietary media players and other Java scripts), and/or any additional content that is appropriate for delivery to user device 102 across communications network 120.

In other embodiments, content data store 134A may also include elements of underlying video content previously augmented with various elements of overlay content (e.g., multimedia content and secondary video content). The augmented video content elements may be stored in formats suitable for rendering and presentation by user device 102 and 112, which include, but are not limited to, Flash video formats (e.g., video content stored in SWF, FLV, and/or FLA formats).

Referring again to FIG. 1, data repository 134 may also include a playlist data store 134B that stores playlist data associated with elements of augmented video content. As described above, an element of augmented video content may be associated with an element of underlying video content and one or more elements of overlay content, which may be displayed during presentation of the underlying video content at predetermined times and/or spatial positions within a display window or container of a media player. In some embodiments, playlist data for the augment video content element may include information identifying the element of underlying video content, the elements of overlay content, the specified display times and positions, and an alphanumeric identifier that links the playlist data to the corresponding element of augmented video content. In some aspects, the playlists may be stored in XML format, in another markup language, in plain text, or in any additional or alternate format appropriate to server 132 and user devices 102 and 112.

Administrator system 140 may include one or more servers or computer systems in communication with video augmentation system 130 across, for example, connection 140. In certain aspects, connection 140A may represent a wireless connection (e.g., an Ethernet connection), or alternatively, a wireless connection (e.g., a WiFi link), that connects administrator system 140 to server 132.

In some embodiments, an individual may access video augmentation system 130 through an interface provided by administrator system 140 (e.g., a web page or a mobile application executed by user device 102). Using the interface provided by administrator system 140, the individual may interact with server 132 and data repository 134 to create or establish an element of augmented video content. For example, the individual may select an element of underlying video content, selecting one or more elements of overlay content for display within the underlying video content, and may specify display times and display positions for corresponding ones of the multimedia content elements and second video content elements.

In one embodiment, server 132 may generate a "playlist" for the augmented video content element that includes information identifying the selected element of underlying video content, the selected elements of overlay content, and the specified display times and positions for the overlay content elements. Server 132 may further assign an alphanumeric identifier to the generated playlist, and may store the generated playlist within playlist data store 134B.

In additional embodiments, server 132 may, either programmatically or upon request from the individual, generate obtain the selected elements of underlying video content and overlay content, and generate the corresponding augmented video content element in accordance with the generated playlist. Server 132 may then generate instructions to store the augmented video content element in content data store 132A for subsequent delivery to user device 102.

Content provider system 150 may include one or more servers and computing devices that provide information to one or more components of computing environment 100. In one aspect, system 150 may be associated with a content provider network and/or advertiser, and may receive a request from user device 102 for corresponding elements of electronic content. By way of example, the content provider network may be associated with a provider of online video content (e.g., Hulu™, Netflix™, or YouTube™), a news network that provides online content and videos to viewers (e.g., CNN™), a electronic or e-commerce retailer (e.g., Amazon.com™), a blogging application (e.g., Tumblr™, Blogspot™, or Instagram™) and any additional or alternate content provider capable of providing electronic content to user device 102.

Social media system 160 may include one or more servers and computing devices associated with a social or micro-blogging network, such as Twitter™, Facebook™, MySpace™, and/or Google™. In one aspect, system 160 may receive a request from user device 102 for elements of social media content, and provide user device 102 with the requested social media content. In some embodiments, system 160 may provide user device 102 with discrete elements of social media content (e.g., a requested Twitter™ post), or alternatively, may continuously push social media content (e.g., a Twitter™ feed corresponding to a particular hash tag and/or a particular handle) to user device 102 through API 106.

Although environment 100 is illustrated in FIG. 1 with a single user device 102, the disclosed embodiments may include a plurality of user devices. Similarly, although computing environment 100 is illustrated in FIG. 1 with a single server 132, a single data repository 134, a single administrator system 140, a single content provider system 150, and a single social media system 160, persons of ordinary skill in the art will recognize that environment 100 may include any number of additional number of servers 132, data repositories 134, administrator systems 140, content provider systems 150, and social media systems 160. Further, as noted above, the arrangement of these components may be modified or otherwise altered from that illustrated in FIG. 1, according to the needs or requirements of the system.

Further, in certain embodiments, one or more of user device 102, server 132, administrator system 140, content provider system 150, and social media system 160 may include a general purpose computer (e.g., a personal computer, network computer, server, or mainframe computer) having one or more processors selectively activated or reconfigured by a computer program, as described below in reference to FIG. 2. In additional embodiments, user device 102, server 132, administrator system 140, content provider system 150, and/or social media system 160 may be incorporated as corresponding nodes in a distributed network, and additionally or alternatively, as corresponding networked servers in a cloud-computing environment. Furthermore, user device 102, server 132, administrator system 140, content provider system 150, and/or social media system 160 may communicate via network 120 with one or more additional servers (not shown), which facilitate the distribution of processes for parallel execution by the additional servers.

Figure 2:
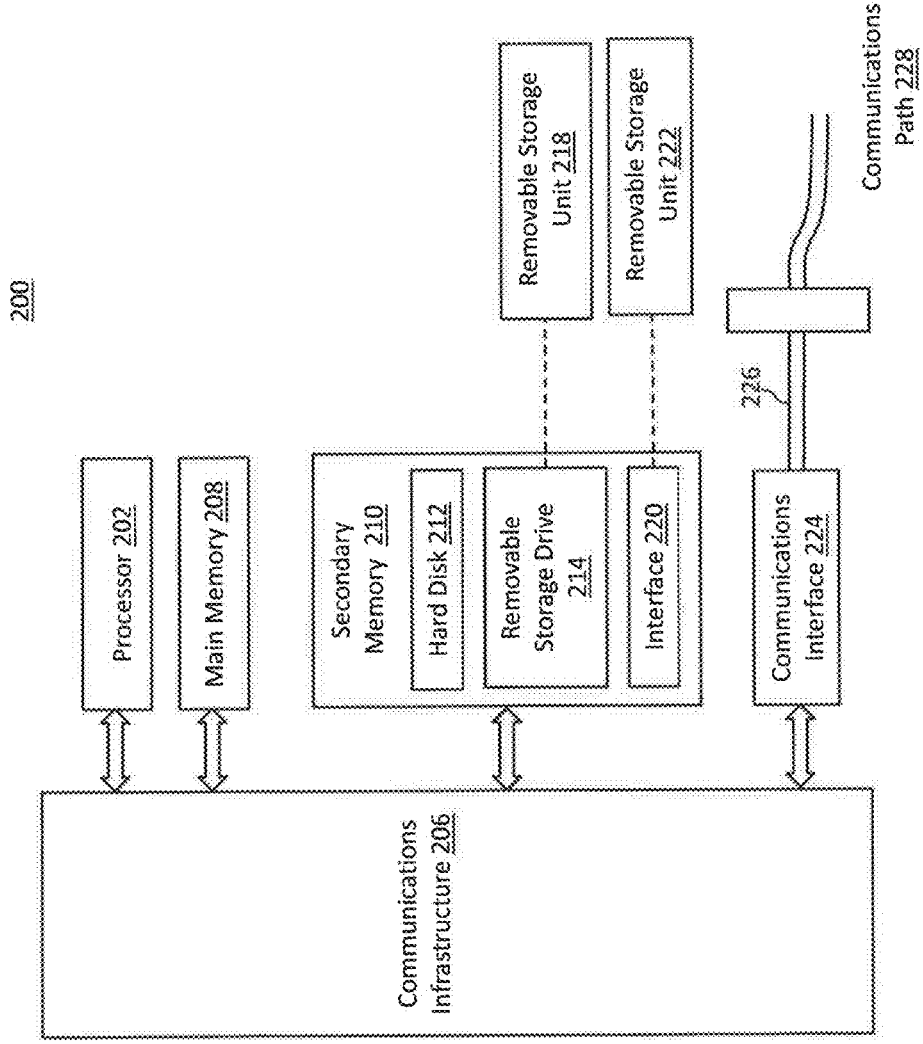
FIG. 2 is a diagram of an exemplary computer system, consistent with disclosed embodiments.

FIG. 2 illustrates an exemplary computer system 200 with which embodiments consistent with the present disclosure may be implemented. In certain embodiments, computer system 200 may reflect computer systems associated with user device 102, server 132, administrator system 140, content provider system 150, and/or social media system 160. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In some embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In one embodiment, signals 226 comprise data packets sent to processor 202. Information representing processed packets can also be sent in the form of signals 226 from processor 202 through communications path 228.

In relation to the exemplary embodiment of FIG. 2, the terms "storage device" and "storage medium" refer to particular devices including, but not limited to, main memory 208, secondary memory 210, a hard disk installed in hard disk drive 212, and removable storage units 218 and 222. Further, the term "computer-readable medium" refers to devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

As described above, user device 102 may execute an Internet-capable media player 104, and an API 106 may communicate with video augmentation system 130 and various providers of content and social media (e.g., systems 150 and 160) across communications network 120 to generate and subsequently present augmented video content to a viewer. In some embodiments, the augmented video content may include a underlying video content into which one or more elements of multimedia content (e.g., overlay content) may be merged at appropriate times and period of time. By way of example, the overlay content may be of potential relevance to the viewer and to one or more portions of the underlying video content, and media player 104 may obtain the overlay content from one or more of video augmentation system 130, content provider system 150, and social network system 160 using the API 106. The augmented video content may, in certain aspects, provide the viewer with a unique and interactive multimedia experience tailored to the viewer's interests.

Figure 3:
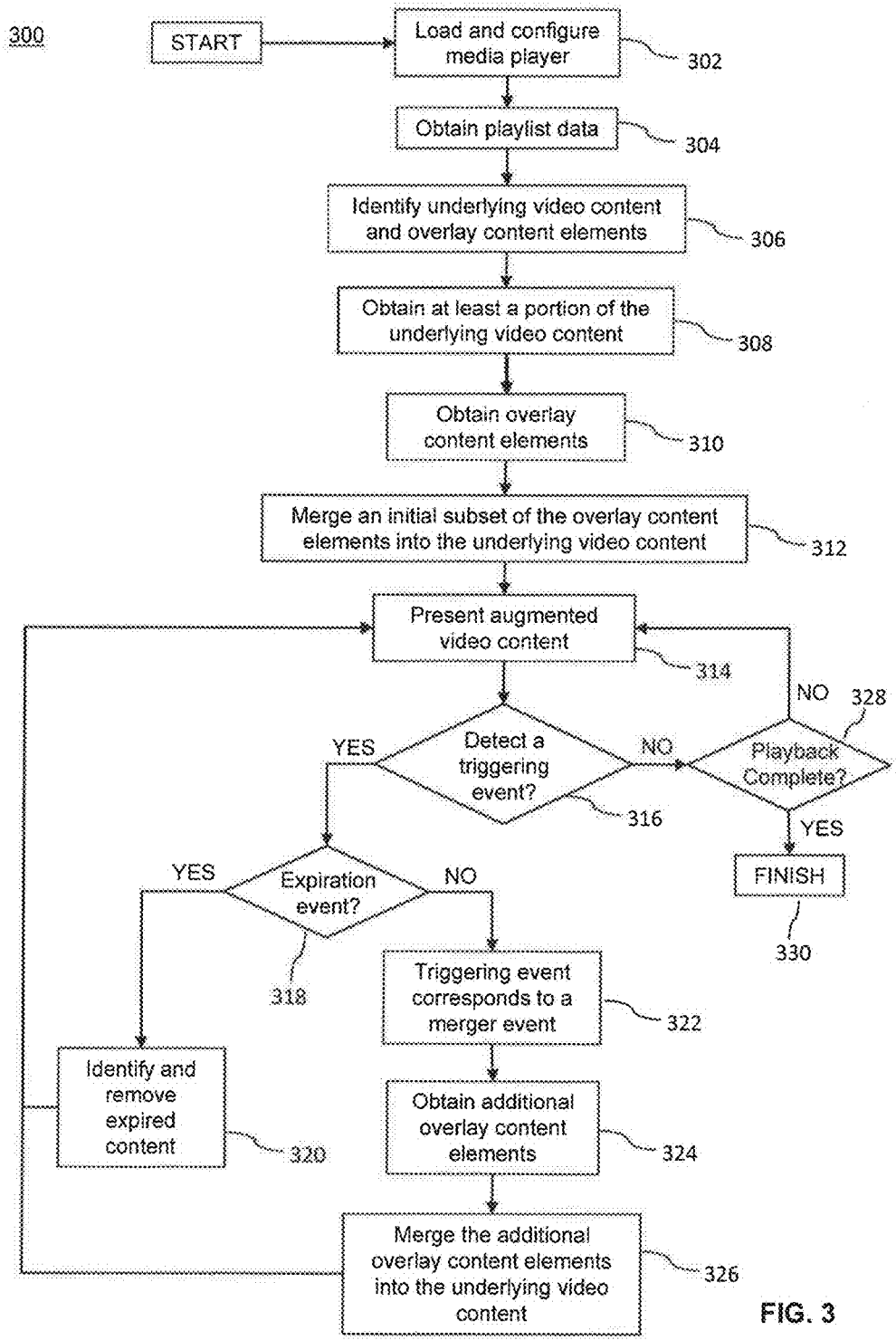
FIG. 3 is a flow chart of an exemplary method for generating and presenting augmented video content to a viewer, according to embodiments of the present disclosure.

FIG. 3 is a flow chart of an exemplary method 300 for generating and presenting augmented video content to a viewer, in accordance with embodiments of the present disclosure. Method 300 may provide functionality that enables a user device (e.g., user device 102) to identify and obtain underlying video content and overlay content, to generate augmented video content by merging elements of the overlay content into underlying video content at appropriate temporal and spatial display positions, and to present the augmented video content to the viewer. In some embodiments, the augmented electronic content may increase the viewer's engagement with relevant content across multiple content delivery platforms, and may encourage to viewer to share experiences with other viewers via email, text message, and various social networks (e.g., Facebook™, Twitter™, or Pinterest™).

In step 302, user device 102 may load and configure media player 104. In some embodiments, media player 104 may represent an Internet-capable media player capable of communicating and exchanging data across communications network 120 through API 106. By way of example, media players consistent with the disclosed embodiments include, but are not limited to, media players capable of presenting multimedia content created in Adobe Flash™ format, media players having APIs compatible with the Video Player Ad-Serving Interface Definition (IAB-VPAID) interface, a proprietary media player, or through any additional or alternate media player having an application programming interface (API) capable of receiving portions of the augmented video content from various severs and computing systems across a communications network.

In one embodiment, media player 104 may be embedded within a web page or other electronic document obtained and rendered for presentation through a web browser executing at user device 102. For example, code establishing the web page may include an embedded code string (e.g., a Java script or an HTML tag) that upon processing by the web browser, renders an instance of media player 104 and establishes one or more initial settings for a container associated with media player 104. Upon establishing the initial container settings, user device 102 may load media player 104 into the container in step 302 and pass the established container settings to media player 104.

In certain aspects, the initial settings may include an alphanumeric character string (e.g., a video ID) that identifies augmented video content available for presentation by media player 104. Further, the initial settings may also include, but are not limited to, a text color associated with media player 104, a particular "skin" or graphical appearance of media player 104, an initial size and/or position of media player 104 and the corresponding container, and a delivery method (e.g., discrete files or through streaming protocols) for content received through API 106.

The disclosed embodiments are, however, not limited to such exemplary initial configurations. For example, in some embodiments, user device 102 may establish any additional or alternate configuration related to the visual appearance and operation of media player 104 that would be appropriate to user device 102 and media player 104. Further, the disclosed embodiments are not limited to embedded media players, and in additional embodiments, media player 104 may be a stand-alone player executed by user device 102 (e.g., a mobile application executed on mobile device 102) in response to a request from the viewer.

In step 304, user device 102 may obtain playlist data associated with the corresponding element of augmented video content. As described above, the augmented video content may include underlying video content and one or more elements of overlay content, which media player 104 may merge into the underlying video content at corresponding display times and display positions. In certain aspects, the obtained playlist data may be linked to the video ID, and may include information identifying the underlying video content, the one or more elements of overlay content, and at least a portion of the display times and positions.

In one embodiment, user device 102 may obtain the playlist data from video augmentation system 130. By way of example, media player 104 may transmit, through API 106, a request for the playlist data across network 120 to video augmentation system 130. The request may include the video ID associated with the augment video content, and a server of video augmentation system 130 (e.g., server 132) may parse the request to obtain the video ID and retrieve playlist data corresponding to the video ID from a data repository (e.g., playlist data store 134B). Server 132 may then transmit the retrieved playlist data across network 120 to user device 102 as a response to the request.

In step 306, media player 104 may parse the playlist data to obtain information identifying the underlying video content and the one or more elements of overlay content. In some embodiments, the obtained information may include alphanumeric character strings identifying the underlying video content and the overlay content, as well as information identifying network locations associated with the underlying video content and the overlay content. By way of example, the network location information may include a URL and/or a network path associated with a computing system accessible to user device 102 across network 120 (e.g., one or more of video augmentation system 130, content provider system 150, and social network system 160).

Media player 104 may also obtain, from the playlist data in step 306, information identifying the display times and display positions at which media player 104 merges the elements of overlay content into the underlying video content. In some embodiments, the obtained display times may represent "triggering events" that cause media player 104 to initiate the merger of a corresponding element of overlay content into the underlying video content, or alternatively, cause media player 104 to remove a previously merged element of overlay content from the underlying video content.

In step 308, user device 102 may obtain at least a portion of the identified underlying video content from a corresponding network location. In one embodiment, user device 102 may transmit a request for the underlying video to a content provider associated with the corresponding network location (e.g., content provider server 150). The request may include, but is not limited to, the alphanumeric character string identifying the underlying video content, information identifying user device 102, and information identifying one or more settings of media player 104 and API 106. Content provider server 150 may process the received alphanumeric character string, retrieve the corresponding underlying video content, and transmit the underlying video content across network 120 to user device 102. In some embodiments, user device 102 may store the received underlying video content for future presentation by media player 104.

In certain aspects, content provider system 150 may provide the underlying video content to user device 102 as a discrete file in a format appropriate to media player 104 (e.g., a Flash video, a QuickTime video, or an AVI). However, due to a length of the underlying video content or a condition of network 120, content provider system 150 may be unable to provide the provide the underlying video content to user device 102 in a single discrete file. In such instances, content provider system 150 may initiate communications with user device 102 (using API 106 of media player 104) to transmit the underlying video content across network 120 using one or more streaming protocols consistent with content provider system 150, media player 104, and API 106.

Additionally or alternatively, the request may include one or more content delivery settings associated with media player 104. For example, as described herein, the embedded code string that instantiates media player 104 may establish an initial content delivery setting, which may be included in the request for the underlying video content. In some embodiments, the content delivery settings indicate a preference for content delivery in one or more discrete files, and further, a format for the one or more discrete files (e.g., .FLV, .SWF, .MOV, etc.). Alternatively, in other embodiments, the content delivery settings may specify a preference for streaming content delivery, and may specify one or more settings for the streaming content delivery (e.g., a bandwidth for streaming and a buffer capacity).

Referring again to FIG. 3, media player 104 may obtain at least a subset of the overlay content elements in step 310. In some embodiments, media player 104 may generate requests for the overlay elements that include, but are not limited to, the alphanumeric character strings identifying the overlay content elements, information identifying user device 102 and/or media player 104, and one or more content delivery settings associated with user device 102, media player 104, and API 106. User device 102 may transmit the generated requests across network 120 to content providers associated with corresponding ones of the identified network locations (e.g., using the identified URLs and/or absolute or relative network paths). The content providers may retrieve the requested elements of overlay content and transmit the overlay content elements to user device 102 across network 120. User device 102 may, in some embodiments, store the received overlay content, along with information identifying a corresponding display time and/or display position, for subsequent merger into the underlying video content by media player 104.

In some embodiments, an element of overlay content may correspond to social media content relevant to the underlying video content. For example, for example, relevant social media content may include individual postings to a social media network that are contextually relevant to a portion of the underlying video content. In certain aspects, an individual may access video augmentation system 130 (e.g., using administrator system 130), and may monitor one or more social media networks (e.g., Twitter™, FaceBook™, and/or Pinterest™) to curate a collection of social media content having contextual relevance to one or more portions of the underlying video content. By way of example, the individual may curate the collection of relevant social content based on a presence of specific keywords within the monitored postings, based on a relevance of posted videos or images to the underlying video content, based on member handles associated with the postings, or using any additional or alternate technique appropriate to the underlying video content. In such embodiments, user device 102 may request the elements of overlay content from video augmentation server 130, and additionally or alternatively, from social media system 160 associated with a corresponding one of the social networks.

The disclosed embodiments are, however, not limited to overlay content curated from social media networks, and in additional embodiments, the overlay content may include any additional or alternate cross-platform content of relevance to corresponding portions of the underlying video content. For example, the overlay content may include content published by a news organization (e.g., CNN™ and NYTimes.com™), content and product reviews published by an e-commerce or electronic retailer (e.g., Amazon.com™), advertisements, content included within a audio or video playlist of the viewer, content published by a blogging application (e.g., Blogspot.com™), and any additional or alternate cross-platform content accessible to the viewer that would an enhance a viewing experience of the underlying video content.

As described herein, cross-platform content may be curated by an individual in communication with video augmentation system 130 (e.g., through administrator system 140), and the individual may identify the relevant portions of the cross-platform content based on a presence of specific keywords within the monitored postings, based on a relevance of posted videos or images to the underlying video content, based on member handles associated with the postings, or using any additional or alternate technique appropriate to the underlying video content. In such embodiments, user device 102 may request the elements of overlay content from video augmentation server 130, and additionally or alternatively, from computer systems corresponding to the providers of the various cross-platform content (e.g., content provider system 150).

In further embodiments, the elements of overlay content may be identified programmatically by server 132 of video augmentation system 130 based on one or more predefined or adaptively determined rules. By way of example, server 132 may monitor social network postings and cross-platform content to identify instances of keywords having particular relevance to the underlying video content (e.g., a title of the underlying video content, names of characters within the underlying video content, and names of one or more performers associated with the underlying video content). Alternatively, the underlying video content may be associated with corresponding social media identifiers (e.g., Twitter™ hashtags), and server 132 may identify as secondary media content any social media positing associated with the identifier of the underlying video content. Further, in an embodiment, the underlying video content may be associated with a corresponding account within a social media network (e.g., a Twitter™ handle or a Facebook™ page), and server 132 may identify as overlay content any postings to the corresponding account, and further, postings and cross-platform content generated by members of the social networks that endorse, like, or follow the corresponding account.

In certain aspects, and in addition to identifying the overlay content, server 132 may also identify those temporal positions and/or display positions within the underlying video content that would be of relevance to the overlay content. Server 132 may store information identifying the overlay content and further, the identified temporal positions within content data store 134, and additionally or alternatively, within data repositories associated with the content providers and/or the social networks (e.g., content provider system 150 and social media system 160).

Further, in an embodiment, user device 102 may obtain in step 310 only a portion of the available overlay content elements. For example, the playlist data for the element of augmented video content may identify a large number of overlay content elements relevant to various portions of the underlying video content. In some embodiments, media player 104 may generate a request in step 310 for overlay content elements relevant to an initial portion of the underlying video content (e.g., an initial time period of one minute, five minutes, or ten minutes). By way of example, the initial portion may be established by an amount of storage available at user device 102, a condition of network 120, a setting of API 106, and/or a request by the viewer.

As shown in FIG. 3, media player 104 may merge an initial subset of elements of the obtained overlay content into the underlying video content in step 312 to establish the augmented video content, and may present the augmented video content to the viewer in step 314. In an embodiment, the initial subset of overlay content elements may include overlay content elements having display times that correspond to an initiation of playback (e.g., a playback time of 0:00:00). By way of example, the initial subset of overlay content elements may include, but are not limited to, various control elements, menu bars, and playback indicators associated with media player 104 (e.g., as specified within a .SWF file associated with the blank player), overlay content elements associated with one or more initially displayed visual elements of the underlying video content, and overlay content elements that media player 104 and/or server 132 determine will be continuously displayed during playback of the underlying video content (e.g., Twitter™ feeds, stock tickers, news updates, and other content continuously pushed to user device 102 from a corresponding provider).

In step 312, media player 104 may merge the initial set of overlay content elements at corresponding spatial positions within a display window or container established by media player 104. In an embodiment, one or more of the initial overlay content elements may be disposed within the container at predetermined or default locations. For example, a Twitter™ feed may be presented to the viewer within a corresponding "social media bar" disposed at a predetermined position within the container, and the one or more visual control elements associated with media player 104 may be displayed at default locations within the established container.

In further embodiments, the playlist data for the augmented video content may specify absolute or relative spatial positions of corresponding overlay content elements, and media player 104 may merge the corresponding overlay content elements into the underlying video content in step 312 in accordance with the specified absolute or relative spatial positions. For example, media player 104 may merge an overlay content element relevant to character of the underlying video content into the underlying video content at a position within the established contained that is proximate to the displayed character.

In step 314, media player 104 present the augmented video content to the viewer. As described above, the augmented video content includes underlying video content into which media player 104 merges one or more elements of overlay content, and in some embodiments, media player 104 may establish a "listener" that monitors a progress handler element of API 106 and tracks the playback time associated with the augmented video content. Using the listener, media player 104 may display the overlay content may be displayed to the viewer at times relevant to corresponding visual elements of the underlying video content, and for durations specified by corresponding playlist data.

Media player 104 may also be configured to display the overlay content elements at positions within the established container that are proximate to the corresponding visual elements. Further, in some embodiments, media player 104 may be configured to monitor the viewer' activity during playback of the augmented video content (e.g., a position of a mouse within the established container or a mouse click on a displayed overlay content element).

In step 316, media player 104 determines whether a triggering event occurs during the playback of the augmented video content. In some embodiments, media player 104 may detect the triggering events by comparing playback positions (e.g., as obtained through the established listener) with temporal positions and merger durations specified within the playlist data to identify "expiration" events and "merger" events.

In an embodiment, an "expiration event" may correspond to a playback position at which media player 104 should stop displaying a overlay content element (i.e., the overlay content element has "expired"). For example, an element of overlay content may be "expired" when media player 104 displays the overlay content element for a period longer than a duration specified by corresponding playlist data. In other embodiments, a "merger" event may correspond to a playback position at which media player 104 should merge a new element of overlay content into the underlying video content, and additionally or alternatively, should merge a previously expired element of overlay content back into the underlying video content.

If media player 104 detects a triggering event during the playback of the augmented video content (e.g., step 316; YES), media player 104 determines in step 318 whether the detected triggering event corresponds to an expiration event. For example, media player 104 may have merged a first overlay content element into the underlying video content at a playback position of one minute and fifteen seconds (1:15), and playlist data may specify that media player 104 should display the corresponding overlay content element for ten seconds. In such instances, media player 104 may detect a triggering event in step 316 at a playback position of one minute and twenty-five seconds (1:25), and may determine in step 318 that the detected triggering event represents an expiration event for the first overlay content element.

If media player 104 determines that the triggering event represents an expiration event (e.g., step 318; YES), media player 104 may be configured to identify the expired overlay content element and remove the expired overlay content element from the underlying video content in step 320. Upon removal of the expired overlay content element, exemplary method 300 passes back to step 314, and media player 104 may continue to present the augment video content to the viewer and may continue to process playlist data and playback positions to detect additional triggering events.

Alternatively, if media player 104 determines that the triggering event does not correspond to an expiration event (e.g., step 318; NO), then media player 104 establishes in step 322 that the triggering event corresponds to a merger event for a new element of overlay content, or alternatively, a previously expired element of overlay content. For example, the playlist data may specify that an additional element of overlay content (e.g., a new element or a previously expired element) should be merged into the underlying video content at a playback position of one minute and twenty-five seconds (1:25). In such instances, media player 104 may detect a triggering event in step 316 at a playback position of one minute and twenty-five second (1:25), and may determine in step 322 that the detected triggering event represents a merger event for the additional overlay content element.

In step 324, media player 104 may parse the playlist data to obtain an alphanumeric identifier associated with the additional overlay content element (and additionally, information identifying a network location from which user device 102 may retrieve the additional overlay content element). In step 326, media player 104 may obtain the additional overlay content element from a corresponding storage unit of user device 102 using the alphanumeric identifier. Alternatively, if user device 102 fails to store locally the additional overlay content element, user device 102 may obtain the additional overlay content element from a content provider (e.g., content provider system 150, social networking system 160, and/or video augmentation system 130) accessible to user device 102 across network 120, as described herein Media player 104 may merge the additional overlay content element into the underlying video content at the corresponding temporal position in step 326. As described herein, media player 104 may merge the additional element of overlay content into the underlying video content at spatial position within the established container that is specified by the playlist data, or alternatively, corresponds to a predetermined default position specified during an initial configuration of media player 104. Exemplary method 300 passes back to step 314, and media player 104 may continue to present the augment video content, with the newly merged element of overlay content, to the viewer, as described above If, however, media player 104 fails to detect the presence of a triggering event within the playback of the augmented video content (e.g., step 316; NO), media player 104 may determine whether the playback of the augmented video content is complete in step 328. If media player 104 determines that the playback is complete (e.g., step 328; NO), then exemplary method 300 is completed in step 330. In some embodiments, media player 104 may generate a message indicating the completion of the playback, which user device 102 may transmit to video augmentation system 130 across network 120.

Alternatively, if media player 104 determines that the playback remains incomplete (e.g., step 328; NO), exemplary method 300 passes back to step 314, and media player 104 continues to present the augment video content to the viewer, as described herein. In some embodiments, media player 104 may generate a message indicative of a status of the playback (e.g., continuing, paused, stopped, etc.) and a temporal position within the playback, and user device 102 may transmit the generated message to video augmentation server 130 at regular intervals (e.g., every second or every five seconds) or in response to specific requests from the viewer (e.g., a request to jump ahead in time to a future temporal position).

User device 102 may configure media player 104 to present augmented video content that provides a viewer with a unique multimedia experience tailored to the viewer's interests. For example, the augmented video content may include one of more elements of multimedia overlay content that are merged into underlying video content during presentation to the viewer. In certain aspects, the merged overlay content may be of potential relevance to the viewer and to one or more portions of the underlying video content, and as such, may enhance a viewing experience associated with the underlying video content.

In some aspects, as described herein, media player 104 may obtain the underlying video content through one or more content provider networks and systems. For example, content provider networks consistent with the disclosed embodiments include, but are not limited to, a provider of online video content (e.g., Hulu™, Netflix™, or YouTube™), a news network that provides online content and videos to viewers (e.g., CNN™), a electronic or e-commerce retailer (e.g., Amazon.com™), a blogging application (e.g., Tumblr™, Blogspot™, or Instagram™), a provider of online gaming application (e.g., the Sony Playstation network), and any additional or alternate content provider capable of providing electronic content to user device 102.

Further, in certain aspects, elements of overlay content may corresponding to social media content and various elements of cross-platform content of relevance to the underlying video content and of interest to the viewer. By way of example, social media content may represent one or more individual postings or feeds from corresponding social networks (e.g., Twitter™, FaceBook™, and/or Pinterest™). Further, in some embodiments, the relevant cross-platform content may include content published by an online news organization (e.g., CNN™ and NYTimes.com™), content and product reviews published by an e-commerce or electronic retailer (e.g., Amazon.com™), advertisements, content included within a audio or video playlist of the viewer, content published by a blogging application (e.g., Blogspot.com™), and any additional or alternate cross-platform content that would contribute to and enhance a viewing experience of the underlying video content. Further, in some embodiments, the overlay content includes, but is not limited to, various control elements, menu bars, and progress indicators associated with media player 104.

Figure 4A:
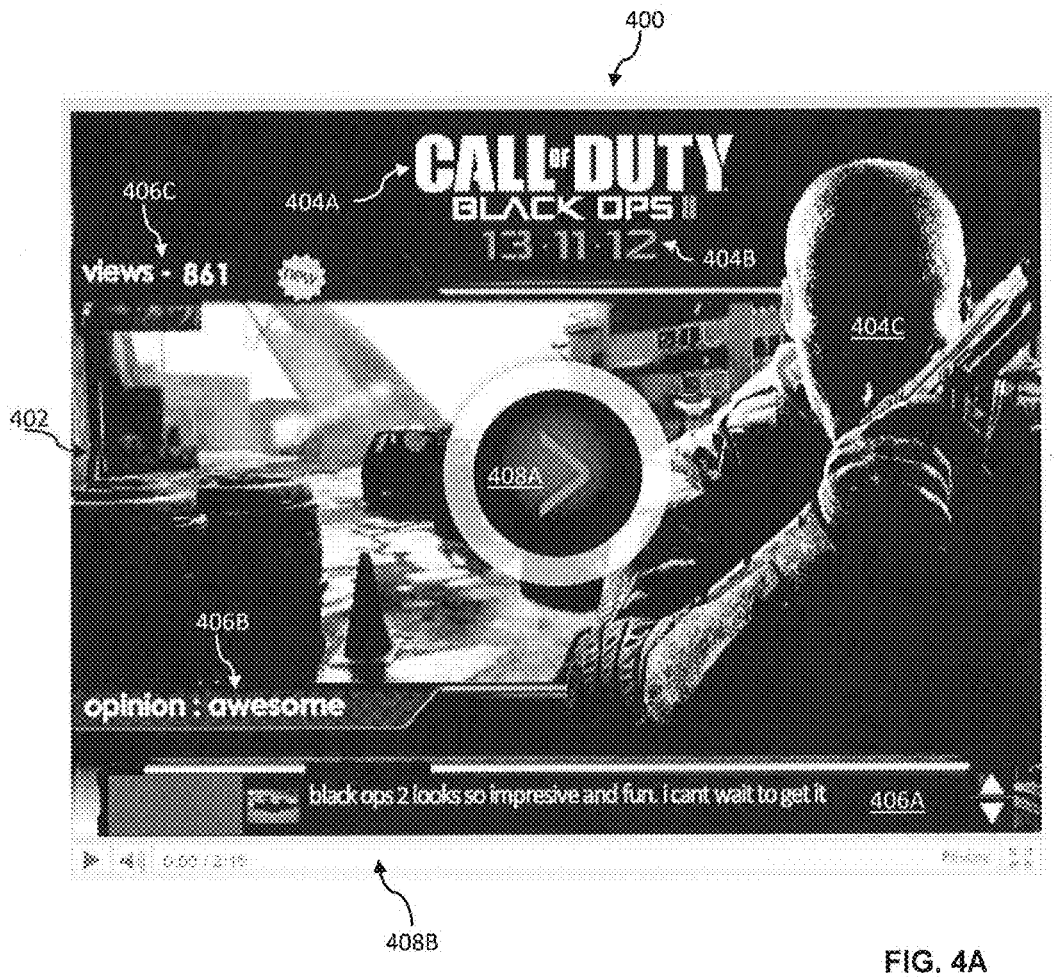
FIGS. 4A-4E are images of exemplary augmented video content, according to embodiments of the present disclosure.

FIG. 4A illustrates an image of exemplary augmented video content 400 generated and presented to a viewer by media player 104, in accordance with the embodiments of the present disclosure. In FIG. 4A, underlying video content 402 may include a Flash video preview of a role-playing game (e.g., Call of Duty®) obtained from a content provider system associated with a developer or an authorized distributor (e.g., ActiVision®). Further, media player 104 may augment underlying video content 402 with graphical elements of overlay content provided by the authorized distributor, which include, but are not limited to branding images 404A, a release date 404B, and a still image of a character 404C featured in the underlying video content. As described herein, media player 104 may obtain overlay content elements 404A, 404B, and 404C from the content provider system associated with the developer of the authorized distributor.

Further, as illustrated in FIG. 4A, media player 104 may also augment underlying video content 402 with elements of social media content manually curated or programmatically identified from one or more social media networks (e.g., Twitter™, Facebook™, and/or YouTube™). For example, a social media bar 406A includes a comments obtained from a related YouTube™ page that provides a viewer's opinion of the role-playing game associated with underlying video content 402. Additional overlay content elements 406B and 406C provide additional information culled from various social networking systems. Additionally, media player 104 may merge elements of overlay content that correspond to visual images of control elements of media player 104, which include, but are not limited to, "play" button 408A and control bar 408B.

As described herein, an individual accessing video augmentation server 130 via administrator system 140 may curate social media content and associate the curated social media content with corresponding underlying video content. Additionally or alternatively, server 132 of video augmentation system 130 may programmatically identify the social media content based on one or more applicable rules. Further, as described herein, elements 406A, 406B, and 406C may display discrete portions of social media content, or alternatively, may display a feed of social media content (e.g., a Twitter™ feed) continuously pushed to user device 102 by a corresponding social media system (e.g., social media system 160). In certain aspects, elements of secondary social media content may include a username or handle associated with the secondary social media content, an avatar (if available), a logo of the social network, and/or a hyperlink to the social media content on a website associated with the social network.

Further, in some embodiments, video layer 104 may merge multiple elements of secondary cross-platform content and secondary social media content within underlying video content 402. For example, a member of a social network (e.g., YouTube™) may have previously viewed underlying video content 402 and may post a comment asking "What is the name of the sound track on this video?." In some embodiments, the individual at administrator system 140 may view the posted comments and determine that an independently written blog posting related to underlying video content 402 states that "The video is cool, but the soundtrack by The Overtones is way cooler—check them out on Spotify." Media player 104 may, in certain aspects, merge the YouTube™ comment on the soundtrack into underlying video content 402 at an appropriate playback position, followed by a subsequent merger of overlay content identifying the independent blog posting and providing a hyperlink to the soundtrack on Spotify, to create a unique social experience for the viewer.

Figure 4B:
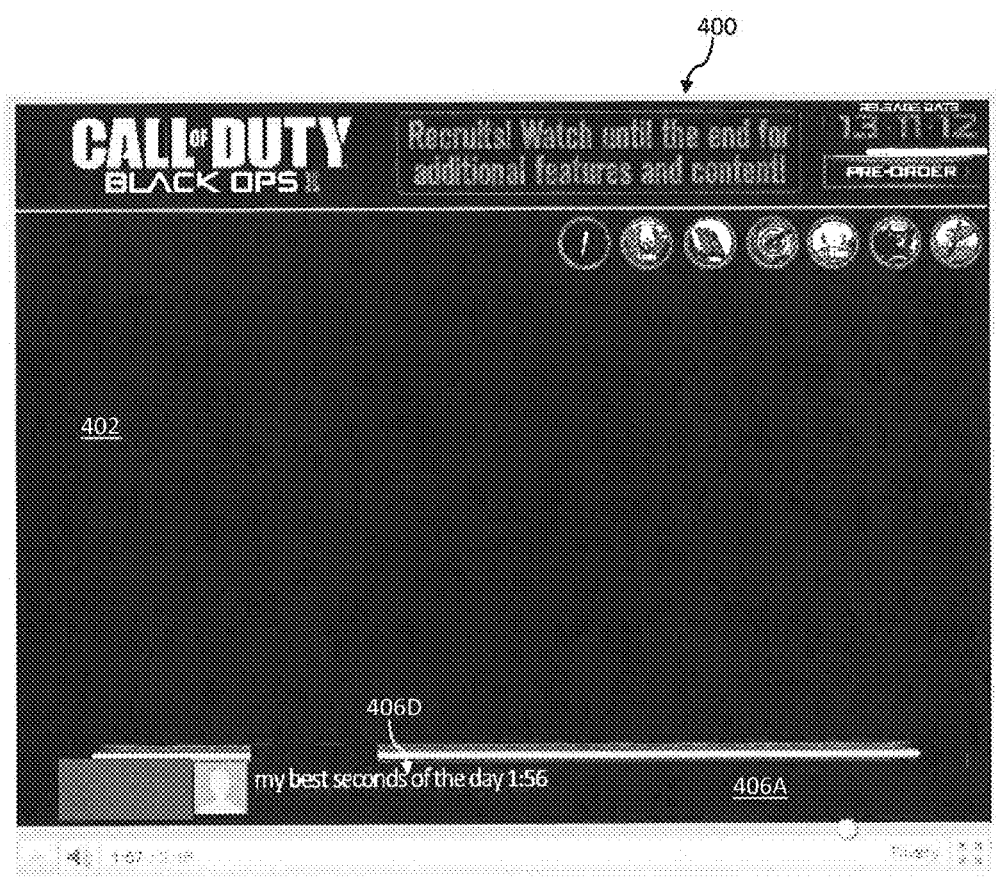
Figure 4C:
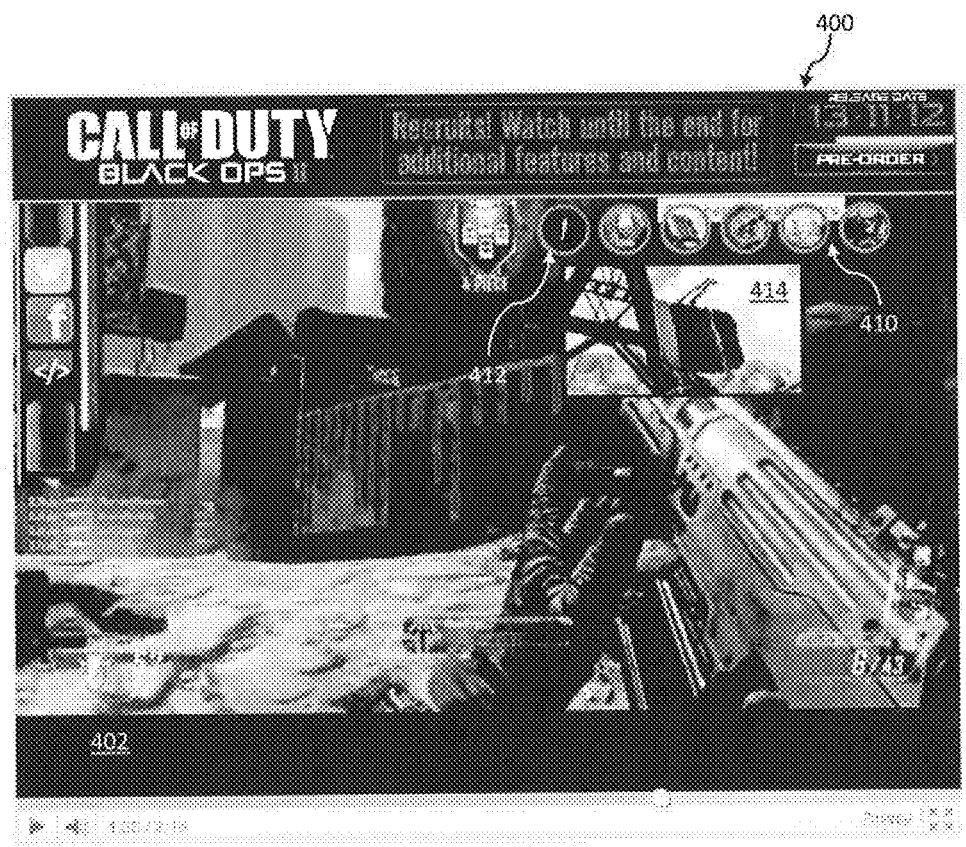

Further, media player 104 may merge secondary social media content into primary content 402 at a relevant temporal position within the playback of augmented video content 400 (and additionally or alternatively, at a spatial position within a container of media player 104 that is proximate to a relevant visual element of underlying video content 402). As described herein, media player 104 may obtain the relevant temporal position and/or the relevant spatial position from playlist data corresponding to augmented video content 200. For example, media player 104 may determine that a particular element of social media content is relevant to a portion of augmented video content 400 having a playback position of one minute and fifty-six second (1:56). In certain aspects, media player 104 may merge the particular element 406D of social media content (e.g., within social media bar 406A) at a playback position of one minute and fifty-six seconds, as illustrated in FIG. 4B.

Further, in some embodiments, overlay content elements consistent with the disclosed embodiments may include interactive visual elements. For example, in FIG. 4G, media player 104 may merge into underlying video content 402 overlay content elements that include circular icons 410. In certain aspects, circular icons 410 may correspond to previously presented scenes of underlying video content 402. When the viewer's mouse pointer or cursor passes over one of icons 410, e.g., icon 412, media player 104 may merge a thumbnail image 414 of the past scene corresponding to icon 412 within underlying video content 402. In some embodiments, if the user clicks on or otherwise selects icon 412, media player 104 may present the scene of primary content 402 associated with icon 412.

Figure 4D:
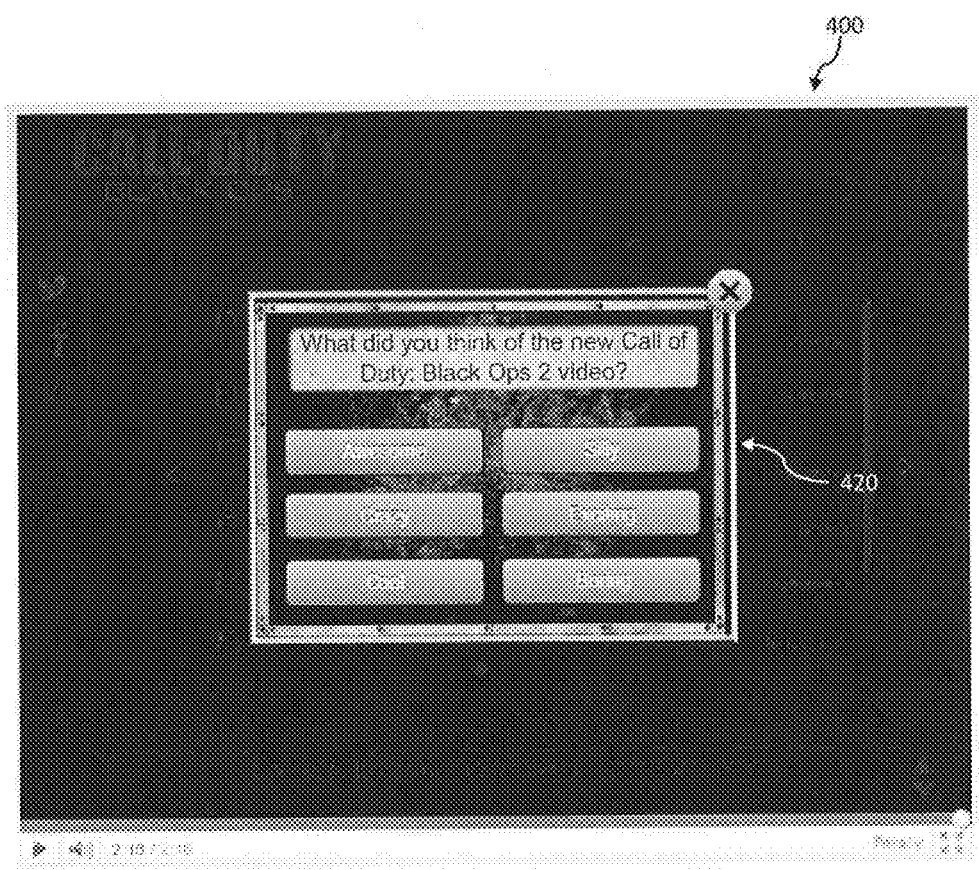

In other embodiments, media player 104 may merge overlay content into underlying video content 402 that includes interactive elements configured to obtain viewer feedback. For example, in FIG. 4D, overlay content element 420 may present, to the viewer, an exemplary set of survey questions that collect information about the viewer's level of interest in underlying video content 402. In certain aspects, media player 104 may receive the viewer's answers to the survey questions and package the answers and information identifying the viewer (e.g., a user name and/or demographic information) into a corresponding report. User device 102 may transmit the corresponding report to video augmentation server 130, a system associated with the distributor or creator of underlying video content 402 (e.g., content provider system 150), and additionally or alternatively, to an system configured to collect viewer feedback (not shown in FIG. 1). Further, media player 104 may merge overlay content 420 into primary content 402 at any time before, during, or at the conclusion of playback of underlying video content 402.

Figure 4E:
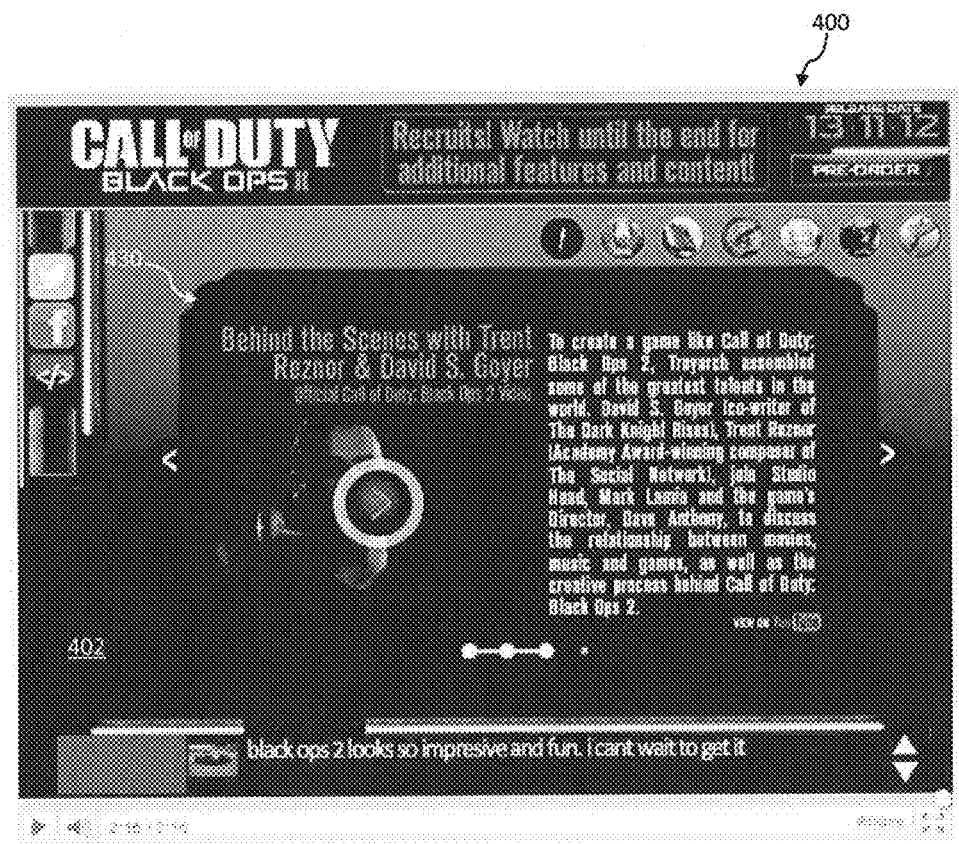

Further, as described herein, overlay content elements consistent with the disclosed embodiments may include one or more elements of secondary video content (e.g., viewer-generated content that discusses underlying video content and/or video content generated by an authorized distributor of the underlying video content). For example, in FIG. 4E, media player 104 may merge secondary video content 430 into underlying video content 402 at a completion of the playback of underlying video content 402. Secondary video content 430 may include a video interview with a developer of underlying video content 402, and media player 104 may obtain secondary video content 430 from video augmentation system 130 and/or from a system associated with a developer or authorized distributor of underlying video content 402 (e.g., content provider system 150).

In further embodiments, an authorized distributor of the underlying video content (e.g., a Flash-based, war-themed role-playing game (RPG), such as Call of Duty®) may create a unique interactive experience tailored to the game and to a viewer. For example, the authorized distributor may coordinate with video augmentation server 130 to develop overlay content that, when merged by media player 104 into the war-themed RPG, may enable a player to shoot at tanks and helicopters with interactive bullet holes and realistic gunshot noises. In some embodiments, media player 104 may merge the overlay content into the war-themed RPG such that the player's cursor is replaced with crosshairs, an element of audio content corresponding to a gunshot is presented when the user clicks the cursor, and a still image corresponding to a bullet hole may be displayed within the war-themed RPG when the click corresponds to a tank, helicopter, or other target.

Further, in some embodiments, the authorized distributor of the underlying video content may coordinate with video augmentation server 130 to create a unique and secret hidden item, e.g., an "Easter egg." Media player 104 may, in certain aspects, merge the "Easter egg" into the underlying video content at a specified temporal position (e.g., at the end of the underlying video content) or in response to a specific action by a viewer (e.g., a specific set of keystrokes entered by the viewer or clicking on a specific portion of the underlying video content). For example, upon completion of the specified action, media player 104 may generate a corresponding indicator, which user device 102 may transmit across network 120 to video augmentation system 130. Upon verification of the transmitted indicator, video augmentation system 130 may transmit multimedia content to user device 102, which media player 104 may merge into the primary content as a hidden discovery or reward at a corresponding position within the playback of the underlying video content. For example, when a viewer enters the letters "mw3," media player 104 may present the interactive bullet holes and realistic gunshot noises to the viewer, as described above.

In the embodiments described above, media player 104 may present elements of overlay content that include hyperlinks to websites or web pages presented by various entities. By way of example, the overlay content elements may include advertisements sponsored by various business entities, and the hyperlinks within the overlay content elements may, once clicked by a viewer, direct the viewer to websites and/or web pages sponsored by the business entities. In such instances, the augmented video content may represented an interactive advertising campaign that tailors the selection of advertisements to match the interests of the viewer, thus increasing an impact of the advertising campaign.

In certain aspects, media player 104, and additionally or alternatively, an executable application linked to API 106, may collect performance data corresponding to the elements of overlay content merged into the underlying video content. For example, media player 104, or the linked executable application, may generate statistics indicating a number of times the viewer clicked on the hyperlinks, and further, information identifying the viewer's further activities on the websites that correspond to the hyperlinks (e.g., a number of individual pages of the websites visited by the viewer, and further, a number of times the viewer purchased products offered for sale by the websites).

In some embodiments, media player 104 may compile the generated statistics and information identifying the viewer and/or demographic characteristics of the viewer into a corresponding report, which may be transmitted to video augmentation system 130 and/or systems associated with the business entities (e.g., content provider system 150). In such instances, the business entities, in conjunction with video augmentation system, may identify augmented video content that includes highly performing advertisements and further, target specific advertisements to particular viewers in order to increase an impact of the specific advertisements.

Figure 5A:
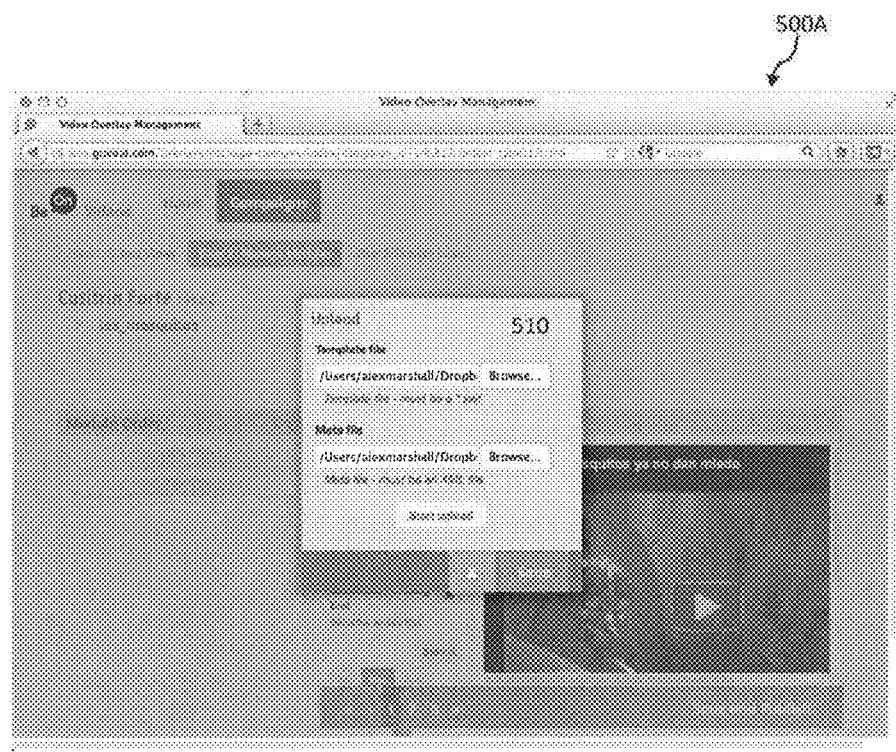
FIGS. 5A-5B illustrate portions of an exemplary user interlace for generating augmented video content, according to embodiments of the present disclosure.
Figure 5B:

In the embodiments described herein, individuals (e.g., business entities, content developers, and content distributors) may access video augmentation system 130 through an interface provided by administrator system 140 (e.g., a web page), identify underlying video content and one or more elements of overlay content, and establish an element of augmented video content based on the identified underlying video content and elements of overlay content. FIGS. 5A and 5B illustrate exemplary interfaces that enable an individual to construct, manage, and publish elements of augmented video content, in accordance with the disclosed embodiments.

For example, as illustrated in FIG. 5A, an individual may access an interface 500 (e.g., a web page) provided by administrator system 140 to construct, manage, and published elements of augmented video content. In certain embodiments, interface 500A may provide a pop-up window 510 that enables the individual to identify a video template file (e.g., a Flash movie file in .SWF format) and a playlist file (e.g., in .XML format) that will store information identifying underlying video content, overlay content elements, and settings for the augmented video content. By way of the example, the settings include, but limited to, display times and positions for the overlay content, as well as network locations from which the underlying video content and overlay content may be retrieved.

In some embodiments, the underlying video content may be specified within the video template file, and various settings for the Flash movie player and for the primary content (e.g., a network location) may be specified within an action scripts associated with and linked to the video template file. Further, the individual may upload and specify one or more modules that correspond to overlay content elements, and the uploaded modules may be identified within window 520 of interface 500B in FIG. 5B. Settings for the overlay content elements, which include, but are not limited to display times, display positions, display durations, and network locations, may be specified within action script files linked to the modules. Further, by arranging a vertical order of the modules within window 520, the individual may generate a layered set of overlay content that may be merged into and onto the underlying video content.

Further, although not depicted in FIGS. 5A and 5B, interfaces 500A and 500B may allow the individual to research various locations conversations are taking place about the underlying video content and incorporate the most genuine and entertaining social media content into the augmented video content through an appropriate module. In some embodiments, the individual may specify a username, avatar, and background image for the incorporated social media content, and further, the individual may specify display times, display durations, display positions, and corresponding network locations within a linked action script file, as described above.

Upon arrangement of the uploaded modules within window 520, and the specification of various option modules within window 530 (e.g., modules and linked action script files corresponding to various social media bars, toolbars, control elements, etc.), the individual may generate and view a preview of the augmented video content 540 within preview window 530. If the individual is not pleased with the preview, the individual may leverage interface 500 to modify the ordering and/or settings of one or more of the modules, delete one or more modules, and upload one or more modules corresponding to additional overlay content. The individual may iteratively preview and then adjust the underlying video content and/or overlay content until the individual generates an acceptable layout.

If the individual is pleased with the preview, the individual ay click on or otherwise activate "Save and Publish" icon 550 in FIG. 5B. In such an instance, server 132 of video augmentation system 130 may generate the playlist file and Flash video file (e.g., in .SWF form) corresponding to the underlying video content, the layered overlay content, and the one or more settings. For example, server 132 may assign the playlist file and Flash video file a common alphanumeric character string that identifies the augmented video content. In some embodiments, the playlist file may be stored in playlist data store 134B. Further, a code string (e.g., a Java script) associated with the generated Flash video file may be embedded in a corresponding web page such that, upon loading by a web browser executing at user device 102, establishes media player 104, as described above.

Further, in additional embodiments, server 132 may retrieve the underlying video content and overlay content elements associated with the augmented video content, and may generate the augmented video content in accordance with the corresponding playlist. Server 132 may store the generated augmented video content within content store 134A, and may provide the augmented video content in a discrete file to user device 102 upon request. In some embodiments, media player 104 of user device 102 may then present the requested augmented video content directly to the viewer.

In further embodiments, server 132 may obtain IP address information associated with the individual accessing administrator system 140, and may determine a location and corresponding language spoken by the individual. Server 132 may, in certain aspects, save and publish versions of the underlying video content and the overlay content elements in which dialogue appears in the language spoken by the individual. Using these embodiments, video augmentation server 130 enables a content developer to produce a single language neutral version of the augmented video content, which may be processed and server by video augmentation server 130 in the determined spoken language prior to presentation.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the invention being indicated by the following listing of exemplary claims.

What is claimed is:

1. A computer-implemented method, comprising:
   obtaining playlist data identifying an element of video content and one or more elements of overlay content, the playlist data and one or more elements of overlay content being linked by a common alphanumeric identifier;
   generating, using at least one processor, augmented video content corresponding to the obtained playlist data, by parsing the playlist data to identify the common alphanumeric identifier, retrieving from memory the one or more overlay content elements based on the common alphanumeric identifier, and merging a first one of the overlay content elements into the video content element at one or more temporal positions within the video content element defined by the playlist data;
   generating, according to one or more streaming protocols, one or more electronic instructions to present the augmented video content to a viewer;
   tracking playback time of the presented augmented video content using a listener module;
   comparing playback positions, based on the playback time tracked by the listener module, with temporal positions and merger durations specified within the playlist data to identify triggering events;
   monitoring user activity during playback corresponding to clicking on one or more overlay content elements;
   detecting, based on the comparison, a first triggering event or a second triggering event during the presentation of the augmented video content, the first triggering event being associated with an expiration of the first overlay content element, and the second triggering event being associated with a merger of a second one of the overlay content elements into the video content element, wherein the second overlay content element comprises a previously expired element of overlay content;
   monitoring a social network feed of a social media network for the presence of specific keywords within social media posts contextually relevant to the augmented video content or the playlist data;
   retrieving from memory one or more additional elements of overlay content from a server associated with the social network, wherein the additional elements of overlay content correspond to portions of the monitored social network feed of the social media network;
   generating, using the at least one processor, modified augmented video content by merging, into the augmented video content, the one or more additional elements of overlay content corresponding to portions of the social network feed, in response to the detected first or second triggering event;
   detecting, through data received from the viewer, a user interaction with overlay content in the modified augmented video content;
   in response to the detected user interaction, generating, using the at least one processor, a second modified augmented video content that removes the interacted-with overlay content;
   identifying user activity on websites corresponding to the one or more overlay content elements clicked on by the user;
   collecting performance data corresponding to the one or more overlay content elements and generating a report based on the user activity and performance data; and
   selecting one or more future overlay content elements based on the report.

2. The method of claim 1, wherein:
   the method further comprises generating one or more electronic instructions to present the augmented video content within a corresponding container; and
   the merged first element of overlay content obscures at least a portion of the video content element presented within the corresponding container.

3. The method of claim 2, wherein the merging of the first element of overlay content comprises establishing one or more spatial positions associated with the presentation of the first overlay content element within the corresponding container.

4. The method of claim 3, wherein the one or more spatial positions comprise at least one of a spatial position defined by the playlist data or a default display position associated with the augmented video content.

5. The method of claim 1, further comprising:
   obtaining (i) a duration associated with the merged first overlay content element and (ii) a current playback position of augmented video content;
   determining whether a difference between the current playback position and the first temporal position exceeds the duration; and detecting the first triggering event when the difference exceeds the duration.

6. The method of claim 5, wherein generating the modified augmented content comprises removing the first overlay content element from the underlying video content element in response to the detected first triggering event.

7. The method of claim 1, further comprising:
obtaining a second temporal position associated with the second overlay content element;
determining whether the second temporal position corresponds to a current playback position of the augmented video content; and
detecting the second triggering event when the second temporal position corresponds to the current playback position.

8. The method of claim 7, wherein generating the modified augmented content comprises merging the second overlay content element into the video content at the second temporal position, in response to the detected second triggering event.

9. The method of claim 1, further comprising:
receiving the second element of overlay content during presentation of augmented video content; and
detecting the second triggering event in response to the received second overlay content element.

10. The method of claim 1, wherein the first or second elements of overlay video content comprise at least one of social media content, secondary video content, or cross-platform electronic content.

11. The method of claim 1, wherein:
the video content element further merges overlay content into underlying video content and includes interactive elements configured to obtain viewer feedback.

12. An apparatus, comprising:
a storage device; and
at least one processor coupled to the storage device, wherein the storage device stores a program for controlling the at least one processor, and wherein the at least one processor, being operative with the program, is configured to:
obtain playlist data identifying an element of video content and one or more elements of overlay content, the playlist data and one or more elements of overlay content being linked by a common alphanumeric identifier;
generate, according to one or more streaming protocols, augmented video content by parsing the playlist data to identify the common alphanumeric identifier, retrieving from memory the one or more overlay content elements based on the common alphanumeric identifier, and merging a first one of the overlay content elements into the video content element at one or more temporal positions within the video content element defined by the playlist data;
track playback time of the presented augmented video content using a listener module;
present the augmented video content to a viewer;
compare playback positions, based on the playback time tracked by the listener module, with temporal positions and merger durations specified within the playlist data to identify triggering events;
monitor user activity during playback corresponding to clicking on one or more overlay content elements;
detect, based on the comparison, a first triggering event or a second triggering event during the presentation of the augmented video content, the first triggering event being associated with an expiration of the first overlay content element, and the second triggering event being associated with merger of a second one of the overlay content elements into the video content element, wherein the second overlay content element comprises a previously expired element of overlay content;
monitoring a social network feed of a social media network for the presence of specific keywords within social media posts contextually relevant to the augmented video content or the playlist data;
retrieving from memory one or more additional elements of overlay content from a server associated with the social network, wherein the additional elements of overlay content correspond to portions of the monitored social network feed of the social media network;
generate, using the at least one processor, modified augmented video content by merging, into the augmented video content, the one or more additional elements of overlay content corresponding to portions of the social network feed, in response to the detected first or second triggering event;
detect, through data received from the viewer, a user interaction with overlay content in the modified augmented video content;
in response to the detected user interaction, generate, using the at least one processor, a second modified augmented video content that removes the interacted-with overlay content;
identify user activity on websites corresponding to the one or more overlay content elements clicked on by the user;
collect performance data corresponding to the one or more overlay content elements and generating a report based on the user activity and performance data; and
select one or more future overlay content elements based on the report.

13. The apparatus of claim 12, wherein:
the at least one processor is further configured to generate one or more electronic instructions to present the augmented video content within a corresponding container; and
the merged first element of overlay content obscures at least a portion of the underlying video content element presented within the corresponding container.

14. The apparatus of claim 13, wherein:
the at least one processor is further configured to establish one or more spatial positions associated with the presentation of first overlay content element within the corresponding container; and
the one or more spatial positions comprise at least one of a spatial position defined by the playlist data or a default display position associated with the augmented video content.

15. The apparatus of claim 12, wherein the at least one processor is further configured to:
obtain (i) a duration associated with the merged first overlay content element and (ii) a current playback position of augmented video content;
determine whether a difference between the current playback position and the first temporal position exceeds the duration; and
detect the first triggering event when the difference exceeds the duration; and in response to the detected first triggering event, remove the first overlay content element from the underlying video content element to generate the modified augmented content.

16. The apparatus of claim 12, wherein the at least one processor is further configured to:
   obtain a second temporal position associated with the second overlay content element;
   determine whether the second temporal position corresponds to a current playback position of the augmented video content; and
   detect the second triggering event when the second temporal position corresponds to the current playback position;
   in response to the detected second triggering event, merge the second overlay content element into the video content at the second temporal position to generate the modified augmented content.

17. The apparatus of claim 12, wherein the at least one processor is further configured to:
   receive the second element of overlay content during presentation of augmented video content; and
   detect the second triggering event in response to the received second overlay content element.

18. The apparatus of claim 12, wherein first or second elements of overlay video content comprise at least one of social media content, secondary video content, or cross-platform electronic content.

19. The apparatus of claim 12, wherein:
   the video content element further merges overlay content into underlying video content and includes interactive elements configured to obtain viewer feedback.

20. A tangible, non-transitory computer-readable medium storing instructions that, when executed by at least one processor, cause the at least one processor to perform a method comprising:
   obtaining playlist data identifying an element of video content and one or more elements of overlay content, the playlist data and one or more elements of overlay content being linked by a common alphanumeric identifier;
   generating, according to one or more streaming protocols, using at least one processor, augmented video content in accordance with the obtained playlist data, the generating comprising parsing the playlist data to identify the common alphanumeric identifier, retrieving from memory the one or more overlay content elements based on the common alphanumeric identifier, and merging a first one of the overlay content elements into the video content element at one or more temporal positions within the video content element defined by the playlist data;
   generating one or more electronic instructions to present the augmented video content to a viewer;
   tracking playback time of the presented augmented video content using a listener module;
   comparing playback positions, based on the playback time tracked by the listener module, with temporal positions and merger durations specified within the playlist data to identify triggering events;
   monitoring user activity during playback corresponding to clicking on one or more overlay content elements;
   detecting, based on the comparison, a first triggering event or a second triggering event during the presentation of the augmented video content, the first triggering event being associated with an expiration of the first overlay content element, and the second triggering event being associated with a merger of a second one of the overlay content elements into the video content element, wherein the second overlay content element comprises a previously expired element of overlay content;
   monitoring a social network feed of a social media network for the presence of specific keywords within social media posts contextually relevant to the augmented video content or the playlist data;
   retrieving from memory one or more additional elements of overlay content from a server associated with the social network, wherein the additional elements of overlay content correspond to portions of the monitored social network feed of the social media network;
   generating, using the at least one processor, modified augmented video content by merging, into the augmented video content, the one or more additional elements of overlay content corresponding to portions of the social network feed, in response to the detected first or second triggering event;
   detecting, through data received from the viewer, a user interaction with overlay content in the modified augmented video content;
   in response to the detected user interaction, generating, using the at least one processor, a second modified augmented video content that removes the interacted-with overlay content;
   identifying user activity on websites corresponding to the one or more overlay content elements clicked on by the user;
   collecting performance data corresponding to the one or more overlay content elements and generating a report based on the user activity and performance data; and
   selecting one or more future overlay content elements based on the report.

* * * * *